Aug. 20, 1929.  W. CONNOR  1,725,567
TIRE RIM TOOL
Filed Aug. 15, 1927
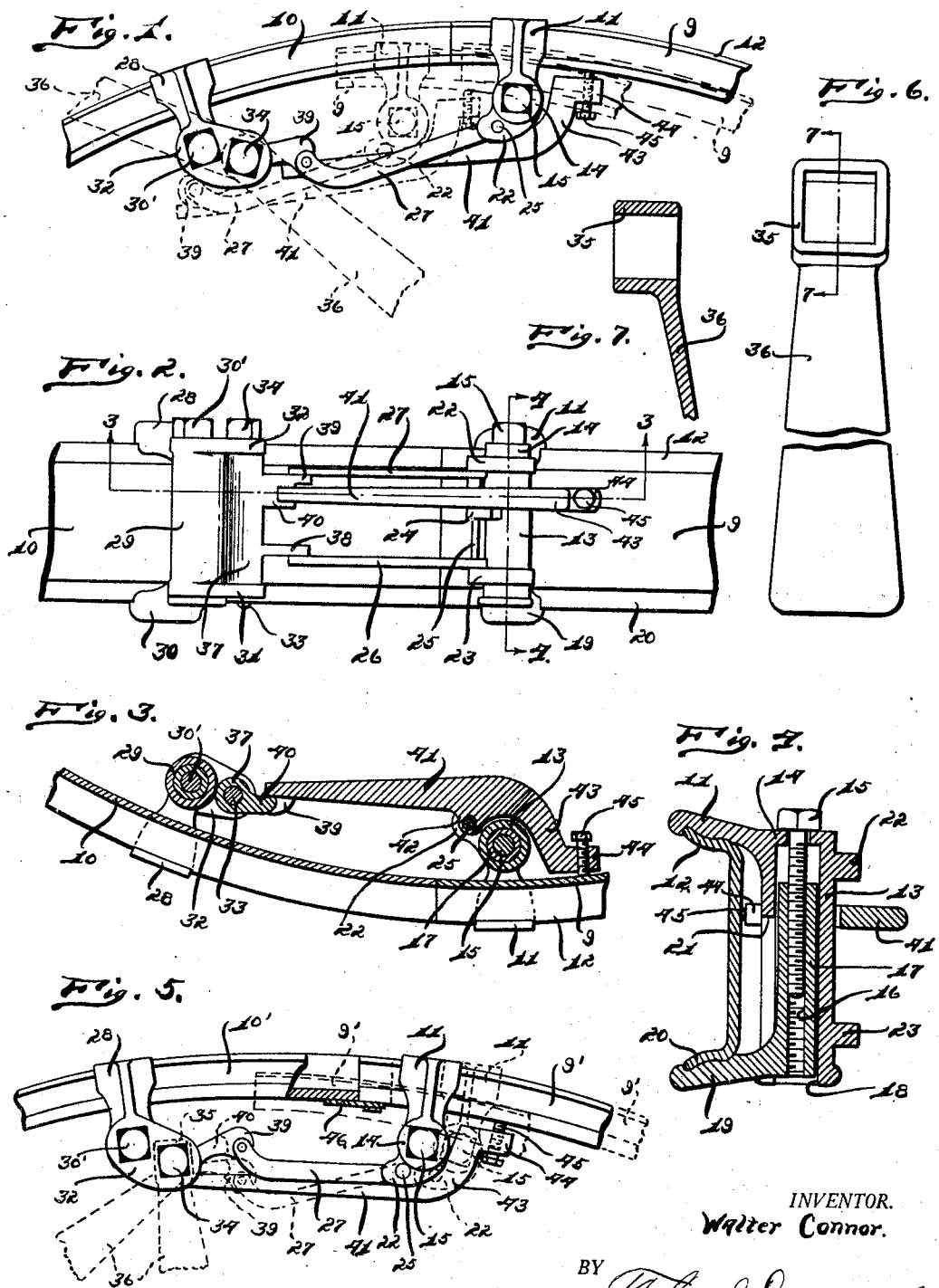
INVENTOR.
Walter Connor.
BY
ATTORNEY.

Patented Aug. 20, 1929.

1,725,567

UNITED STATES PATENT OFFICE.

WALTER CONNOR, OF WINDSOR, ONTARIO, CANADA.

TIRE-RIM TOOL.

Application filed August 15, 1927. Serial No. 212,903.

My invention relates to a new and useful improvement in a tire rim tool, and has for its object the provision of a tool adapted for attachment to a split tire rim for reducing the diameter of the tire rim by bringing the ends into overlapping relation so as to permit the removal of the tire therefrom.

It is another object of the present invention to provide a tire rim tool of this class which will be simple in structure, economical of manufacture and highly efficient in use.

Another object of the invention is to provide a tire rim tool of this class which is adapted for use on various types of rims and which is so constructed and arranged that in operation it may be utilized to move the meeting ends of the tire rim out of engagement a predetermined distance, and thence radially inwardly prior to the movement bringing the ends into overlapping relation, or to move one of the ends immediately radially inwardly, and thence into overlapping relation without effecting a spreading.

It is another object to provide a device of this class having a rockable beam adapted for engaging at one side the inner surface of the tire rim, and at the opposite side an actuating member, the tool being so arranged that the engagement of the actuating member with this rockable beam may be effected at various relative positions of the engaging ends with the tire rim.

Another object is the provision of a tire rim tool of this class adapted for use with a split tire rim having a toggle arrangement for moving the ends of the tire rim relatively to each other and provided with a lever cooperating with the toggle for effecting movement of the ends of the tire rim, relatively to each other.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention applied to a tire rim.

Fig. 2 is a bottom plan view of the invention applied to a tire rim.

Fig. 3 is a sectional view taken on line 3—3 of Fig. 2.

Fig. 4 is a sectional view taken on line 4—4 of Fig. 2.

Fig. 5 is a side elevational view of the invention showing it applied to a tire rim of a different type with the gripping members in relative locations on the tire rim different from the location shown in Fig. 1.

Fig. 6 is a plan view of the wrench used in the invention.

Fig. 7 is a fragmentary sectional view taken on line 7—7 of Fig. 6.

In the drawings I have illustrated the invention adapted for use with a tire rim having the ends 9 and 10 which, when the tire rim is in its position so as to form a true circle, engage each other. The invention comprises a gripping jaw 11 adapted to engage the flange 12 of the tire rim, this gripping jaw being preferably integral with the cast sleeve 13, through the wall 14 of which is projected the bolt 15 adapted to thread into the bore 16 formed in the sleeve 17 which is slidably mounted in the bore 18 of the sleeve 13, and formed on which, preferably integral therewith is a gripping jaw 19 for engaging the opposite flange 20 of the tire rim. As shown in Fig. 4, the sleeve 13 is formed with an axially extending slot 21, so that by threading the bolt 15 into the sleeve 17, the gripping jaw 19 may be moved inwardly out of the marginal limits of the sleeve 13 and extended beyond the same when desired. Projecting from the sleeve 13 are lugs 22, 23 and 24. A pin or bolt 25 is projected through these lugs 23, 24 and 22 and through the ends of arcuate arms 26 and 27 to pivotally mount these arms thereon.

A cooperating pair of gripping jaws is provided, the jaw 28 projecting outwardly from and being preferably cast upon the sleeve 29. The jaw 30 projects outwardly from and is preferably formed integral with a telescoping sleeve similar to the sleeve 17, this structure being as already described, a suitable bolt being threaded into the telescoping sleeve, as shown in Fig. 4 and provided with the square head 30'. Projecting outwardly from the sleeve 29 are lugs 31 and 32, and extended through these lugs 31 and 32 and rotatable is a bolt 33 having a square head 34 for reception of the socket 35 of the wrench carrying the handle 36. Positioned between the lugs 31 and 32 and fixedly mounted upon the bolt 33 is a sleeve 37, projecting outwardly from which are lugs 38 and 39. To the lug 38 is pivotally attached the opposite end of the arm 26 and to the lug 39 is pivotally attached the opposite end of the arm 27, these arms 26 and 27 with the lugs 38 and 39 forming toggles, as clearly appears in Fig. 1. A boss or projection 40 is formed on the lug 39.

A rocking beam 41 is provided with a lug 42 through which the pin or bolt 25 is projected so that the beam 41 is rockingly mounted upon the pin or bolt 25. As shown clearly in Fig. 3, this beam 41 which serves as a lever, is provided with a curved, short end 43 which is provided with the inwardly turned portion 44 in which is threaded the screw 45, this screw being adapted, when the device is in operative position on the tire rim, for engaging the inner surface of the rim.

In operation the device is positioned on the tire rim having one set of jaws clamping the tire rim at one side of the split, and the other set clamping the tire rim at the opposite side. In Fig. 1 the jaws are so positioned relatively to each other and relatively to the split that the boss 40 is normally in engagement with the long end of the beam or lever 41. Consequently, as soon as the sleeve 37 is rocked in a clockwise direction, as shown in Fig. 1, the beam or lever 41 will be caused to rock on its pivot, thus "breaking" the tire rim and moving one end radially inwardly, a very slight separation of the ends of the rim being effected as the toggle moves past center. It is believed evident that if the jaws are so spaced apart that the toggle will be, when the tire rim ends are in engagement with each other, on center, the radial inward movement of the end of the rim will be effected without a prior withdrawal or separation of the ends. As the sleeve is continued in its rocking movement after the end of the rim has been moved radially inwardly so as to clear the other end of the rim, the toggle will move to the position shown in dotted lines, as will the jaw 11, thus bringing the ends of the rim into overlapped relation and reducing the diameter of the rim sufficiently to permit an easy and quick removal of the tire casing therefrom. In this movement the toggle, it will be noted, has not passed beyond center, but the boss 40 in its engagement with the beam or lever 41 will have passed beyond center so that the rim is locked in its overlapped position.

In Fig. 5 I have shown the device mounted on a different type of tire rim, a clip or tongue 46 projecting from one of the ends so as to afford a means for locking the rim ends in engaging position and retaining the same in alignment. With this type of a rim, it is necessary, before bringing the ends into overlapped relation, that they be separated sufficiently to permit disengagement, the separation necessary being dependent upon the length of the tongue 46. Consequently, in mounting the jaws or gripping members on the tire rim ends 9' and 10' at opposite sides of the split, it is necessary that the toggle be moved upwardly so as to have passed upwardly beyond center, so that when the sleeve 37 is rocked in a clockwise direction, the toggle will move from center before the boss 40 engages the lever or beam 41, thus thrusting the ends outwardly from each other before effecting the radial inward movement. This is believed quite clearly shown by the dotted lines in Fig. 5.

The screw 45 serves as a means for adjusting the device to rims of different sizes and particularly the rims of different height flanges so that the proper engagement with the undersurface of the rim may be effected at the time of engagement of the boss 40 with the beam or lever 41.

In this way I have provided a rim tool which serves the functions intended on various types of rims and one which is also easily and quickly operated. It is preferred to form on the bolt 15 the same size head as the head 31 and the head 34, so that a single wrench will serve to attach the device to the rim and at the same time, afford a means for rocking the sleeve 37 to release the rim and bring the ends into overlapped relation.

It is believed evident that a reverse rotation or rocking of the sleeve 37 after the ends have been brought into overlapped relation, will restore the rim to its normal position, and permit the desired engagement of the ends.

It is believed evident that the beam 41 may, if desired, be fixedly mounted on the sleeve 13. It is also believed evident that the adjustment bolt 45 may be removed from the angularly turned end 44 and mounted on the element 40.

The recesses in the jaws 11 and 19 and 28 and 30 are formed on a straight line so that when the jaws are brought into engagement with the grooved edge of the tire rim flanges, a gripping of the jaws on the flanges is effected so that creeping of the jaws around the rim is prevented.

While I have illustrated and described the preferred form of my invention, I do not wish to limit myself to the precise details of structure shown, but desire to avail myself of such variations and modifications as come within the scope of the appended claim.

I claim:

A rim tool of the class described comprising: a pair of gripping members adapted for gripping a split tire rim at opposite sides of the split; a toggle for connecting said gripping members; means for bending said toggle for moving said jaws into relative approach and effecting relative withdrawal of the same; a rockably mounted member adapted for engaging adjacent one end the inner surface of said tire rim and adjacent the opposite end said bending means, the rocking of said rockably mounting member in one direction effecting a radial inward movement of one end of said rim.

In testimony whereof I have signed the foregoing specification.

WALTER CONNOR.